United States Patent [19]
Moriwaki

[11] Patent Number: 5,492,980
[45] Date of Patent: Feb. 20, 1996

[54] THERMOPLASTIC MOLDING RESIN COMPOSITION

[75] Inventor: Takeshi Moriwaki, Osaka, Japan

[73] Assignee: Kishimoto Sangyo Co., Ltd., Osaka, Japan

[21] Appl. No.: 133,636

[22] Filed: Oct. 7, 1993

[30] Foreign Application Priority Data

Oct. 12, 1992 [JP] Japan ................................. 4-299324
Oct. 12, 1992 [JP] Japan ................................. 4-299349

[51] Int. Cl.⁶ ...................... C08L 61/06; C08L 61/12; C08L 77/00
[52] U.S. Cl. ...................... 525/429; 523/208; 524/494; 524/495; 524/538; 525/66; 525/167; 525/183; 525/432; 525/420
[58] Field of Search ..................... 525/397, 429

[56] References Cited

U.S. PATENT DOCUMENTS

| | | | |
|---|---|---|---|
| 3,901,952 | 8/1975 | Kishimoto et al. | 525/429 |
| 4,337,331 | 6/1982 | Hancock | 525/429 |
| 4,603,179 | 7/1986 | Hosaka et al. | 525/429 |
| 4,617,356 | 10/1986 | Hosaka et al. | 525/429 |
| 4,845,162 | 7/1989 | Schmitt et al. | 525/423 |
| 5,124,391 | 6/1992 | Muehlbach et al. | 524/420 |

FOREIGN PATENT DOCUMENTS

| | | | |
|---|---|---|---|
| 219341 | 1/1958 | Australia | 525/429 |
| 718493 | 11/1954 | United Kingdom | 525/429 |

*Primary Examiner*—Ana L. Carrillo
*Attorney, Agent, or Firm*—Koda and Androlia

[57] ABSTRACT

Thermoplastic molding resin composition comprising 70–95 weight % of aliphatic polyamide, 5–30 weight % of phenolic resin, and 0–20 % of semi-aromatic amorphous polyamide, and further high density polyamide composition comprising 100 parts by weight of the mixture of 60–95 parts by weight of aliphatic crystalline polyamide, 5–30 parts by weight of phenolic resin, and 200–1000 parts by weight of metal powder or metal oxide powder or inorganic filler having specific gravity of more than 2.6.

5 Claims, No Drawings

THERMOPLASTIC MOLDING RESIN COMPOSITION

BACKGROUND OF THE INVENTION

1. Field of the Invention

This invention relates to high strength, high rigidity polyamide composition having less reduction of physical properties at high humidity environments, to be used for mechanical and electric parts including inertial mass such as flywheel or micromotor parts, and also relates to a polyamide composition especially suitable for automobile underhood parts having resistance to calcium chloride and zinc chloride employed as antifreeze of road surface.

2. Prior Art

Plastic replacement of automobile parts are extensively examined because it contributes to reducing the weights of automobile. Since polyamide resin is superior in heat resistance, mechanical properties, chemical resistance, oil resistance, moldabilities, etc., it is examined and being used for wide application in automobile parts.

But, since the strength and rigidity of polyamide, having rich amide group such as nylon 6, nylon 66, and nylon 46 largely changes between dry and wet condition so it is very unstable in physical properties and dimensional stability, they also have a serious defect that since they have affinity with metal ions, they are attacked by chlorides such as calcium chloride or zinc chloride, so it extremely difficult to the application for automobile underhood parts such as fuel tubing, intake manifold pipe, clutch master cylinder, motor washer, fastener grip, lamp socket, relay block for switches, connector, etc.

Many attempts have been made to solve the problems including, addition of hydrocarbon groups of 6–22 carbon numbers, blending polyolefin with polyamide, blending polyolefin polymer having acid anhydride at the chain end, blending ethylenic ionomer and/or nitril rubber to nylon, blending lower amide group polyamide, blending polyamide having aromatic constituent, but these attempts cannot improve resistance competitive to nylon 12 or nylon 11.

But nylon 12 and nylon 11 have lower heat resistance than nylon 6 and are very high cost plastics, a cheaper material having resistance to chlorides have eagerly desired by the industries.

As a prior art for a plastic for automobile underhood parts, Japan Patent S62-9617 (Reference 1) proposes a two components resin compound (A+B) wherein (A) 25–95 weight % of aliphatic polyamide and (B) 5–75 weight % of amorphous polyamide mainly composed of aromatic amino acid and/or aromatic discarboxylic acid.

The aliphatic polyamide of component (A) are, by the detailed description of the reference 1, polycaprolactam (nylon 6), polyhexamethylene adipamide (nylon 66), polyhexamethylene sebacamide (nylon 610), polyhexamethylene dodecanamide (nylon 612), polyundecanoamide (nylon 11), polydodecanamide (nylon 12) and their copolyamide, mixed polyamide. The degree of polymerization is not specified, and polyamides having relative viscosities in the range of 2.0–5.0 can be selected.

Then the amorphous polyamide, mainly composed of aromatic amino acid and/or aromatic dicarboxylic acid of component (B) are, the polyamide made by melt polymerization of aromatic amino acid and/or aromatic dicarboxylic acid such as p-aminomethyl benzoic acid, p-aminoethyl benzoic acid, m-aminomethyl benzoic acid, terephthalic acid, isophthalic acid, etc.

It is described that hexamethylene diamine, undecamethylene diamine, dodecamethylene diamine, 2.2.4-/2.2.4-trimethylhaxamethylene diamine, m-xylilene diamine, p-xylilene diamine, p-aminocyclohexyl methane, p-aminocyclohexyl propane, bis(3-methy,4-aminocyclohexyl) methane, 1.3-bis(aminomethyl) cyclohexane, 1.4-bis(aminomethyl) cyclohexane, isophorondiamine, etc. can be used as the diamine for another component of polyamide. But there are no description on the effect for the resistance for zinc chloride which exhibit the most severe action among many chlorides.

Opened Patent H4-23863 (Reference 2) proposes polyamide composite for the parts of mechanical, electric and automobile use, improved in rigidity and strength by addition of inorganic fibers (F) such as glass fibers, carbon fibers, etc. to the melt blend of (A) component of Reference 1 and semiaromatic amorphous polyamide (hereinafter referred to as component (C)).

The said (C) component is a polymeric material having molecular structure of linking main chain units of linear aliphatic hydrocarbon and aromatic hydrocarbon by amide group, and is essentially amorphous transparent polyamide and copolyamide. But there is no description about the special effect for the resistance for chlorides.

Contrary to prior arts described above which are only based on the viewpoint of diluting the amide groups in the polyamide molecular chain or reducing the water absorption, this inventor had concentrated his energy to the polyamide composition for improving the resistance to chlorides, and finally developed a composition of this invention characterized in having superior strength and rigidity and also possesses resistance to chlorides, thus completed the present invention as described below.

SUMMARY OF THE INVENTION

The composition relating to the present invention is basically composed of 70–95 weight % of aliphatic crystalline polyamide (hereinafter abbreviate to component (A)) and 5–30 weight % of phenolic resin (hereinafter abbreviate to component (P)).

DETAILED DESCRIPTION OF THE INVENTION

Aliphatic crystalline polyamide of component (A) is, the polymeric materials having amide linkage in the main chain, and is linear polymer obtained by polycondensation of diamine and dibasic acid, ring opening polymerization of lactam, polycondensation of aminocarboxylic acid, etc., and having relatively short linear chain. Example of such polyamide includes, polycaprolactum (nylon 6), polyhexamethylene adipamide (nylon 66), polytetramethylene adipamide (nylon 46), but do not restricted by this examples.

Phenolic resin of component (P) is so called novolak prepolymer made by condensation reaction of phenol and formaldehyde at phenol excess condition, and generally having degree of polymerization of 2–10 and melting point of 50°–140° C.

The term of phenolic resin is the general term including cresol resin and xylenol resin made from crude materials of cresol and xylenol, respectively.

Also included is cashew modified novolak resin made by replacing 10–50 % of phenol to cashew oil. It is preferable to use phenolic resin having free phenol below 5%. The polyamide resin composition of the present invention exhibiting superior resistance to chlorides is accomplished by adding such phenolic resin.

The mixing ratio of component A (aliphatic crystalline polyamide) and component P (phenolic resin) is determined by many blending tests and physical measurements and finally concluded to exhibit most desirable properties in strength and uniformity between tile range of A (70–95):P (30–5).

It is surprising that even at relatively lower addition levels of components P, the effect for modification is great, especially in preventing the reduction of physical properties at high humidity condition and the improvement of resistance to chlorides.

As described above, the basic composition of the resin relating to the present invention is a melt blend resin comprising a new combination of component A and component P, which exhibit high strength and high rigidity and also possesses good resistance to chlorides as illustrated by Example 1 described later, it is also possible to add a wide variety of components to the (A+P) component resin to modify the physical properties.

MODIFICATION 1

For example, 0–20 weight % of semiaromatic amorphous polyamide (component C) may be added to the basic composition of the melt blend resin of component A and component P (hereinafter abbreviate to (A+P) composition) to produce (A+P+C) resin composition.

The semiaromatic amorphous polyamide (component C) is a polymeric material having molecular structure combining linear aliphatic hydrocarbon and aromatic hydrocarbon by amide linkage, and substantially transparent amorphous polyamide or copolyamide.

As a definite composition of such amorphous polyamide includes, for example, co-polycondensation product of hexamethylene diamine as diamine and two components of terephthalic acid and isophthalic acid as the dibasic acid generally called as PA6I/6T, or co-polycondensation product of two components of hexamethylene diamine and diamino alicyclic compound such as bis-(4-amino-cyclohexyl)-methane as diamine and two components of isophthalic acid and terephthalic acid as dibasic acids (generally called PA6I/MACM T). The amorphous polyamide do not possesses melting point and the glass transition temperature (Tg) lies between 100°–200° C. The amorphous polyamide to be used for the present invention is preferred to have glass transition temperature in the range of 120°–180° C.

The suitable ratio (weight) of A component of aliphatic crystalline polyamide, P component of phenolic resin and C component of semiaromatic polyamide is A (60–95):P (5–30):C (0–20).

MODIFICATION 2

It is also possible to add inorganic fibers (component F) to the above ((A)+(P)+C) composition to produce ((A)+(P)+C+F) composition to enhance the strength and the rigidity. As the reinforcing fiber, glass fiber is most general and is composed of glassy material normally called E glass, and soled in the form of chopped strand fiber of 5–15μ diameter and 3–6 mm length. Another material includes high strength glass fiber composed of S glass. Another reinforcements includes carbon graphite fibers, potassium titanate whisker, alumina fiber, zirconium fiber, MOS ($MgSO_4 \cdot 5MgO \cdot 8H_2O$), which may be compounded together with glass fiber. The ratio of glass fiber F depends on the object and is preferable to use 25–250 parts by weight to 100 parts by weight of (A+P) or (A+P+C) resin base. The characteristic of the composition is, which become clear by the examples described later, that the retention of physical properties at high humidity condition is much more greater than those of the glass fiber reinforced polyamide of prior art.

The most effective method for caring out this invention is to mold the parts made by the composite of this invention by injection molding machine directly from the tumble blend of each component of resins and glass fiber. Namely, this invention can tie accomplished by injection molding the tumble blend mixture of 100 parts by weigh of resin mixture comprising (A) polyamide 70–95%, (P) novolak phenolic resin prepolymer 5–30%, (C) amorphous nylon 0–20% and glass fiber preferably 50–200 parts by weight, by injection molding machine equipped with mixing mechanism described below. It is also preferable to add suitable binder or blend oil to prevent the separation of each component of the mixture and to make the manufacturing at stable condition.

The mechanism for melting and mixing the composite is accomplished by equipping suitable mixing and dispersing mechanism to the screw and/or the cylinder of reciprocating screw injection molding machine. The structure for such screw used for this invention is that intensifies the mixing/dispersing action of normal single screw, including multi-flights helical screw, Dulmage type screw, pin type screw, gear type screw. The most preferable mixing/dispersing mechanism for the injection molding machine relating to this invention is that described in Japan Patent No. 1,104,727 (U.S. Pat. No. 4,300,840). But this invention is not limited by this process.

MODIFICATION 3

The physical properties of the melt blend resin comprising above written (A+P) composition, can be modified by compounding metal, metal oxide, etc. The metal powder to be melt compounded includes metal powder such as atomized iron powder, copper powder, bronze powder, and inorganic filler such as barium sulfate and lead silicate. These high density fillers are fine powder shape and are added and mixed with resin, and it is desirable to surface treat the fillers with organic silane compounds such as γ-aminopropyl triethoxysilane, N-β (amino-ethyl) γ-aminopropyl triethoxysilane. The high density plastic obtained by such process can be easily molded by injection molding to a wide variety of shapes, especially suitable for automotive underhood parts, flywheels of electric equipments, core parts for micromotor.

This invention enabled to produce high density plastic composite characterized in having high strength and also having performance to be used under high humidity condition by mixed high density filler at high concentration to polyamide resin previously added with phenolic resin, which is not attainable by prior arts.

MODIFICATION 4

The polyamide composition referred to this invention can incorporate stabilizers, plasticizers, mold release agents, nucleating agents, lubricants, etc. of a prior arts, besides silane coupling agents described in foregoing sentence.

It is also possible to add polyamide elastomer such as nylon 6/ polypropyleneglycol diamine, nylon 12/ polybuthyleneglycol diamine, acid anhydride modified polyolefin, ethylene-acrylic acid copolymer, ionomer, etc., to control the flexibility of the above polyamide composition.

This invention can be carried out by melt blending the mixture of each component by single screw extruder, twin screw extruder, or extruder equipped with special kneading mechanism. For the production of glass fiber filled composite, alloy is made by melt blending of resin mixture components at the first step, and then injection molding after dry blending glass fiber, or glass fiber are mixed with resin to make glass filled compounds. In the compounding process, it is desirable to feed the resin mixture at the feed port of the machine and feed glass fiber into the molten resin from the inlet port installed at the down stream of the extruder to retain the glass fiber length in the composite longer, which is favorable to produce composite having greater mechanical properties.

PREFERRED EMBODIMENT

Examples 1, 2 and 3 (Comparative Examples 1 and 2)

The following examples illustrates the composition of the present invention.

(1) Materials

Aliphatic crystalline polyamide, PA6: EMS-CHEMIE AG. Grilon A28GM Phenolic resin, Novolak prepolymer, Melting point 110° C.

(2) Comparative materials

Comparative material 1:

PA6 (nylon 6): EMS-CHEMIE AG. Grilon A28GM

Comparative material 2:

PA12 (nylon 12): Ube Industries Ltd. 3020

(3) Compounding and molding

Phenolic resin and nylon 6 are mixed in the ratio as shown in Examples 1–3, and extruded by single screw extruder at 240° C. to produce compound of pellet form. These pellet and comparative materials of nylon 6 and nylon 12 are injection molded by conventional injection molding machine to mold flexural test specimens specified in ASTM D790 (12.6 mm in width, 3.2 mm in thickness, 126 mm in length).

(4) Tests

Specimens are immersed in 50% calcium chloride solution and 50% zinc chloride solution at room temperature for 1 week, and after the solution on the surface is wiped off by filter paper, the weight change is measured and flexural tests are carried out immediately. As shown in Table 1, the result indicates that compositions of this invention have better retention of flexural strength and flexural modulus than those of nylon 6 and are improved to the same level of nylon 12, and the strength and modulus is greater than those of nylon 12.

Examples 4 and 5 (Comparative Examples 3 and 4)

(1) Compounding and molding

For examples 4, 5 and comparative example 4, crystalline polyamide, amorphous polyamide, phenolic resin and glass fibers, written below, are mixed as shown in Table 2, and injection molded using the injection molding machine equipped with a kneading mechanism described in Japan Patent No. 1,104,727.

Molded parts are a set of tensile specimen as specified in ASTM D638 and flexural specimen as specified in ASTM D790 (12.6 mm in width, 3.2 mm in thickness, 126 mm in length), and injection molded at cylinder temperature of 280° C. Comparative material 3 is molded by conventional injection molding machine (SN75 by Niigata Engineering Co.).

(2) Materials, Comparative Materials (a) Low materials

Aliphatic crystalline polyamide (PA6): EMS-CHEMIE AG. Grilon A28GM

Phenol resin: Novolak prepolymer

Semi-crystalline amorphous polyamide (PA6I/6T): EMS-CHEMIE AG. Grivory G21

Glass fiber: Nitto Boseki Co. 3PE454

(b) Comparative material 3

Glass fiber reinforced aliphatic polyamide PA6: Ube industries Ltd. 1015GC9, glass fiber 45 weight % composite Comparative material 4

Composition made by Japan Patent Application H2-127487: composite of PA6/amorphous nylon=85/15

(2) Results

As shown in Table 2, example 4 and 5 show a marked superiority against comparative example 3, and also for comparative example 4 especially at physical properties at high humidity conditions, the composition of the examples of this invention show less reduction of physical properties, thus it was proved that this invention greatly improves the performance of glass fiber reinforced polyamide of prior arts.

Examples 6 and 7 (Comparative Example 5)

(1) Materials

Iron powder: KIP300R, 200 mesh passed, made by Kawasaki Steel Corp.

Aliphatic crystalline polyamide (PA6): 1011F made by Ube Corp.

Phenolic resin
  A: Novolak prepolymer
  B: Bellpearl R800 made by Kanebo Corp.

(2) Example 6 a. Iron powder 10,000 g is mixed at high speed mixer (Super Mixer made by Kawata Corp.) and silane coupling agent (Sila-ace 330 made by Chisso Corp.) 20 g (diluted by solution of modified alcohol/water=9/1), and mixing is continued at 800 rpm for 8 hrs. to evaporate solvent to made treated iron powder.

b. Powder nylon 1400 g, phenolic resin (novolac prepolymer) 150 g, and methylenebisamide 20 g are added and mixed at 800 rpm for 10 minutes.

c. Finally blend oil 20 g is added, and mixed at 800 rpm for 5 minutes to complete the manufacturing of blend composition.

(3) Example 7

Blend composition is manufactured by the same process of Example 1, except phenolic resin is changed from novolak type prepolymer to Bellpearl R800 made by Kanebo Corp.

(4) Comparative example 5

Blend composition is manufactured by the same process of Example 1, but powder nylon is changed to 1550 g and phenolic resin is not added.

The blend composition of Example 6, 7 and comparative example 5 is molded to tensile specimen of ASTM D638 Type 4 (3.2 mm thickness) and Flexural test specimen of ASTM D790, and the physical properties are measured at dry condition, 50% RH equilibrium condition, and 70% RH equilibrium condition, respectively (Table 3).

(5) Results

The results indicated that the high density plastic composition of the present invention is not only superior in strength and flexural modulus but also retains the properties at high humidity environment, which is desirable for the material to be used for flywheel assembled with steel shaft by force-fit.

This invention provides a polyamide resin composition comprising 70–95 weight % of aliphatic crystalline polyamide and 5–30 weight % of novolak phenol resin prepolymer having superior stress-crack resistance to calcium chloride and zinc chloride solution, and also provides high performance plastic composition having small reduction of physical properties by water absorption even at high humidity conditions, the performance of which is most suitable for the material used for automobile underhood parts. Thus, the resin composition (A+P) composed of suitable ratio of aliphatic crystalline polyamide and phenolic resin, enabled to produce tough composite material which had never been accomplished by prior arts, therefore it is an extremely effective invention from the viewpoint of enhancing the properties of plastics to the level that is possible to replace metallic materials.

The basic composition of (A+P) can be modified by adding other components, for example, the reinforced polyamide composition comprising 100 parts by weight of the mixture of 70–95 weight % of aliphatic crystalline polyamide, 5–30 weight % of novolak phenol prepolymer, 0–20 weight % of semi-aromatic amorphous polyamide, and 100–250 parts by weight of glass fiber provides high performance plastic composite far much exceed the strength and the rigidity of glass fiber reinforced polyamide of prior arts, and also have small reduction of physical properties by the water absorption at high humidity environments, so the performance can match with metallic materials such as die cast aluminum alloy or zinc alloy. In addition, since it is light weight and superior in moldability, the industrial value is extremely great.

The basic composition of (A+P) can also be modified by mixing high density metal powder or inorganic compounds, to provide high density plastic composite having less reduction of performance at high humidity conditions, which developed applications in automobile parts and flywheel for electric equipments.

TABLE 1

|  | Example 1 | Example 2 | Example 3 | Comparative Example 1 | Comparative Example 2 |
|---|---|---|---|---|---|
| Resin compositions |  |  |  |  |  |
| Nylon | PA6 | PA6 | PA6 | PA6 | PA12 |
| Ratio (weight %) | 90 | 85 | 80 | 100 | 100 |
| Phenolic resin |  |  |  |  |  |
| Ratio (weight %) | 10 | 15 | 20 | 0 | 0 |

TABLE 1-continued

|  | Example 1 | Example 2 | Example 3 | Comparative Example 1 | Comparative Example 2 |
|---|---|---|---|---|---|
| Physical properties |  |  |  |  |  |
| Initial values |  |  |  |  |  |
| Flexural strength, kg/mm$^2$ | 12.0 | 13.2 | 13.5 | 11.9 | 6.3 |
| Flexural modulus, kg/mm$^2$ | 312 | 329 | 335 | 294 | 155 |
| After 1 week immersion in CaCl$_2$ 50% solution |  |  |  |  |  |
| Flexural strength, kg/mm$^2$ | 9.7 (81) | 11.4 (86) | 11.9 (88) | 7.3 (61) | 4.8 (76) |
| Flexural modulus, kg/mm$^2$ | 234 (75) | 250 (76) | 288 (86) | 156 (53) | 116 (75) |
| Weight change, % | 0.85 | 0.32 | 0.78 | 1.56 | 0.55 |
| After 1 week immersion in ZnCl$_2$ 50% solution |  |  |  |  |  |
| Flexural strength, kg/mm$^2$ | 9.2 (77) | 10.3 (83) | 11.2 (83) | 6.4 (54) | 4.3 (76) |
| Flexural modulus, kg/mm$^2$ | 237 (76) | 257 (78) | 271 (81) | 135 (46) | 110 (71) |
| Weight change, % | 1.13 | 1.05 | 0.95 | 2.9 | 0.51 |

The values in ( ) indicate retention to initial values

TABLE 2

|  | Comparative Example 3 | Comparative Example 4 | Example 4 | Example 5 |
|---|---|---|---|---|
| Compositions |  |  |  |  |
| Crystalline polyamide, type | PA6 | PA6 | PA6 | PA6 |
| weight, g |  | 850 | 800 | 850 |
| Phenolic resin weight, g | 0 | 0 | 200 | 110 |
| Semi-crystalline polyamide, type |  | PA6I/6T | — | PA6I/6T |
| weight, g |  | 150 |  | 150 |
| Glass fiber weight, g | (45%) | 1000 | 1000 | 1110 |
| Physical properties |  |  |  |  |
| Dry, as molded |  |  |  |  |
| Tensile strength, kg/mm$^2$ | 19.0 | 25.0 | 22.0 | 24.1 |
| Flexural modulus, kg/mm$^2$ | 1200 | 1500 | 1560 | 1640 |
| Izod impact, kg · cm/cm | 9.0 | 17.0 | 13.2 | 14.1 |
| Conditioned, equilibrium to 23° C., 50% RH |  |  |  |  |
| Tensile strength, kg/mm$^2$ | 10.5 | 19.3 | 21.0 | 21.4 |
| Flexural modulus, kg/mm$^2$ | 620 | 1200 | 1550 | 1610 |
| Izod impact, kg · cm/cm | 16.0 | 19.0 | 13.0 | 14.0 |
| Conditioned, equilibrium to 23° C., 70% RH |  |  |  |  |
| Tensile strength, | '9.0 | 16.0 | 19.5 | 20.3 |

TABLE 2-continued

|  | Comparative Example 3 | Comparative Example 4 | Example 4 | Example 5 |
|---|---|---|---|---|
| kg/mm$^2$ |  |  |  |  |
| Flexural modulus, kg/mm$^2$ | 410 | 1050 | 1450 | 1410 |
| Izod impact, kg · cm/cm | 22.0 | 19.5 | 14.0 | 14.2 |

TABLE 3

| Physical properties | Example 6 | Example 7 | Comparative Example 5 |
|---|---|---|---|
| Specific gravity Dry, as molded | 4.2 | 4.2 | 4.2 |
| Tensile strength, kg/mm$^2$ | 5.9 | 4.81 | 4.4 |
| Flexural modulus, kg/mm$^2$ | 1490 | 1300 | 1220 |
| Conditioned, equilibrium to 23° C. 50% RH |  |  |  |
| Tensile strength, kg/mm$^2$ | 4.5 | 3.7 | 2.8 |
| Flexural modulus, kg/mm$^2$ | 1150 | 920 | 780 |
| Conditioned, equilibrium to 23° C., 70% RH |  |  |  |
| Tensile strength, kg/mm$^2$ | 4.2 | 3.5 | 2.2 |
| Flexural modulus, kg/mm$^2$ | 950 | 810 | 450 |

I claim:

1. A thermoplastic molding resin composition comprising:

70–95% by weight of the total composition of a polyamide selected from the group consisting of Nylon 6 and Nylon 66; and 5–30% by weight of the total composition of a novolak prepolymer consisting of a condensation product of phenol and formaldehyde.

2. A thermoplastic molding resin composition according to claim 1, wherein the prepolymer has a degree of polymerization of 2–10 and a melting point of 50°–140° C.

3. A thermoplastic molding resin composition according to claim 2 further comprising 0–20% by weight of the total composition of a semiaromatic amorphous polyamide consisting of a linear aliphatic hydrocarbon linked to an aromatic hydrocarbon by an amide linkage.

4. A thermoplastic molding resin composition according to claim 3, wherein the amorphous polyamide has no melting point and a glass transition temperature of 100°–200° C.

5. A thermoplastic molding resin composition according to claim 4, wherein the glass transition temperature is 120°–180° C.

* * * * *